March 11, 1969  F. TESKE ET AL  3,432,174
SLIDE-RING SEAL
Filed Nov. 4, 1966  Sheet 2 of 2

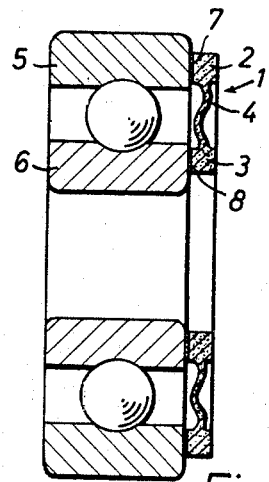
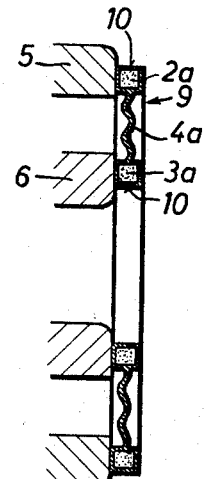
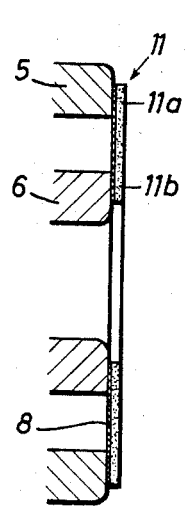
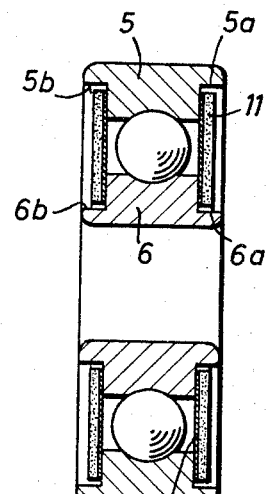

INVENTORS
FRITZ TESKE
& 
BY LOTHAR TESKE

United States Patent Office 3,432,174
Patented Mar. 11, 1969

3,432,174
SLIDE-RING SEAL
Fritz Teske, Industriestr. 32, and Lothar Teske, Industriestr. 30, both of Porz-Westhoven, Germany
Filed Nov. 4, 1966, Ser. No. 592,082
Claims priority, application Germany, Nov. 6, 1965, 29,735
U.S. Cl. 277—80         9 Claims
Int. Cl. F16j 15/34

ABSTRACT OF THE DISCLOSURE

This invention provides a slide ring seal assembly for sealing relatively moving components. The assembly includes a pair of coaxially, radially disposed annular disks comprising magnetic material. A means is provided for securing each of the said annular disks to a corresponding moving component. A flexible, magnetic slide ring seal means is magnetically secured to the said annular disks to provide the desired sealing effect.

Background of the invention

In slide-ring seals of the type to which this invention is directed it is common to employ some type of magnetic means to maintain the slide-ring seals in intimate contact with relatively movable components. A ring or collar of magnetic material or a pair of annular metallic and/or magnetic collars are often associated with such slide-ring seals with the magnetic attraction being effected through air slots of the collar or adjacent spaced collars. Such air slots necessarily reduce the magnetic forces and the gripping power between the slide-ring portions and the associated relatively movable components is accordingly minimized.

Generally such conventional slide-ring seals include a first independent element which is adapted to be secured to one component, a second independent element which is adapted to be secured to another relatively movable component, and a third independent element securing the first and second elements to each other. Connection of these three elements to each other is both time-consuming and costly, not to mention the continual problem of uniting these components sufficiently successfully to prevent disassembly under actual working conditions. More often than not the interconnecting element must be reinforced at the points of connection thereof with the magnetic elements, and the overall effect is a minimization in the size of the interconnecting element and an attendant failure of such slide-ring seals to be employed in many common mechanisms.

Summary of the invention

It is therefore a primary object of this invention to provide a simplified slide-ring seal which is extremely efficient in its operation and utilizes magnetic means of a homogeneous nature which overcomes the difficulties inherent in manufacturing and maintaining operative conventional slide-ring seals. This object is accomplished by constructing the basically three-part conventional slide-ring seal of a single unitary integral construction, thereby completely avoiding the disadvantages of conventional seals heretofore noted. In particular, the slide-ring seal is of a single, one-piece elastomeric and/or polymeric construction having an intermediate web portion connecting inner and outer portions with magnetic or magnetizable material (iron filings) contained within at least the inner and outer portions and, if desired or found necessary, the intermediate portion. Preferably, the slide-ring seal is a circular or annular disk of a uniform or constant thickness, although various modifications in accordance with this invention are possible.

In this manner the slide-ring seal is not only magnetically attractable but is integrally formed of intrinsically flexible elastic and/or polymeric material. One highly desirable feature of such a construction is that in addition to the flexible nature of the connecting portion which adjusts for defects in trueness, tolerance etc. of the movable components, the portions of the slide-ring seal which are coupled to the relatively movable components (ball bearings, etc.) are flexible and/or resilient and can similarly conform to irregularities, etc. of the relatively rotatable components. A very effective face-to-face seal can thereby be effected with a minimum thickness of the slide-ring seal, which is, of course, highly advantageous from a low-cost manufacturing standpoint.

Another important feature of the invention is the ability of the slide-ring seal to automatically adjust its operation in an alternating fashion, if necessary, to thereby increase the sealing ability of the seal and reduce the wear thereof. As an example, the slide-ring seal is coupled by its inner and outer annular magnetic portions and an integral intermediate web to respective inner and outer races of a bearing assembly. Presuming the inner bearing race is stationary, the inner magnetic portion will be fixed to the inner race and relative movement will occur only between the rotating outer race and the outer magnetic portion of the slide-ring seal. However, after continual operation and attendant wear it has been found that the magnetic attraction will sometimes vary and due to the novel construction of the slide-ring seal of this invention the magnetic properties thereof (magnetic attraction) varies in proportion to the forces caused by, in this example, the bearing races. If the outer race becomes immobile and the inner race moves the relative attraction of the slide-ring seal automatically adjusts to this condition and the outer magnetic porion becomes fixed to the outer race while relative movement is possible between the inner magnetic portion and the inner race. This transfer of magnetic attraction enhances the overall sealing characteristics of the slide-ring seal particularly during the life thereof as continual wear causes in some cases, alternating fixation of the inner bearing race, inner magnetic portion and outer bearing race outer magnetic portion.

Another major advantage of the slide-ring seal of this invention is the ability to readily vary the flexibility of the seal by the selective addition of magnetic or magnetizable material to an elastomeric and/or polymeric slurry from which the seal is manufactured. Assuming, for example, that the inner and outer annular portions are connected by an interconnecting web of a predetermined thickness, the flexibility of rigidity (ability thereof to be bent) can be varied by varying the amount of magnetic or magnetizable material added to the plastic; i.e., more magnetic material results in a stiffer seal while lesser magnetic or magnetizable material results in the production of a more bendable seal. While this may, of course, be achieved by varying the concentration and/or choice of the binding agent, the variation in the magnetic material content is a simplified and actually more reliable method of varying the flexibility of the seal.

In a preferred embodiment of the invention the slide-ring seal is composed of a thermoplastic binding agent such as, for example, polyamide, a polymer product of tetrafluorethylene, dioadipinic acid polyester/diisocyanate and the like mixed in the ratio of 20% of this polymer to 80% of the magnetic and/or magnetizable material. The seal may be magnetized either axially or diametrically, but the latter has been found to be highly more efficient than the former.

Brief description of drawings

In keeping with the above, the invention will be described immediately hereinafter with reference to the accompanying drawings in which:

FIG. 1 is an axial cross-sectional view taken through a slide-ring seal of the invention, and illustrates annular inner and outer magnetized portions joined by a web, the seal being shown associated with inner and outer races of a bearing assembly;

FIG. 2 is an axial cross-sectional view taken through another slide-ring seal of the invention, and illustrates encapsulated magnetizable and/or magnetic material and a connecting web therebetween;

FIG. 3 illustrates another sliding-ring seal of the invention, and depicts an annular polymeric member carrying embedded magnetic particles, and a foil covering therefor;

FIG. 4 illustrates a pair of the sliding-ring seals of FIG. 3, and illustrates the seals received in annular recesses of the inner and outer races of the bearing assembly;

Description of specific embodiments

Figure 5:
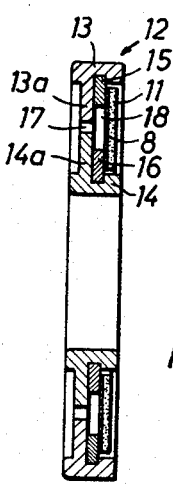
FIG. 5 illustrates the sliding-ring seal of FIG. 3 associated with two pair of annular spaced relatively rotatable members.

A magnetic slide-ring seal constructed in accordance with this invention is illustrated in FIGURE 1 and is generally designated by the reference numeral 1. The seal 1 includes a pair of spaced outer and inner annular portions 2 and 3, respectively, connected by an annular intermediate portion 4. The portions 2, 3 and 4 are an admixture of polymeric and/or elastomeric material and magnetic and/or magnetizable particles, although the intermediate portion 4 can be devoid of such aforementioned particles. The slide-ring seal is therefore narrow, compact, and doubly magnetic i.e., at portions 2 and 3.

The seal 1 is shown associated with relatively rotatable components or races 5, 6 of a race assembly, either of which can be fixed and the other of which is movable. The portion 2 is magnetically attracted and/or secured to the race 5, the portion 3 is magnetically attracted and/or secured to the race 6, and respective metallic foil or polymeric (tetrafluoroethylene)layers 7, 8 are provided to reduce frictional drag between the seal 1 and the portions 2, 3. The layers 7, 8 are extremely thin and may be, for example, 2 to 5 hundredths of a millimeter.

In the embodiment of the invention shown in FIGURE 2 a double magnet sliding-ring seal 9 is shown to include annular portions 2a and 3a which consist of pre-rigidified cores of magnetizable iron filings encased in skins 10, 10 joined to one another by a web or membrane 4a. The skins 10, 10 and the web 4a are polymeric or elastomeric material and, if desired, the faces of the skins 10, 10 opposing the bearing races 5, 6 may be provided with annular members, such as 7, 8 of FIGURE 1. However, this is rarely necessary because the magnetic material is disposed wholly inwardly of the skins 10, 10 and the latter present highly efficient sealing surfaces to the races 5, 6.

In the embodiment of the invention shown in FIGURE 3 the slide-ring seal 11 is formed of a circular or annular disk having outer and inner annular sealing portions 11a, 11b, respectively. The disk is of a uniform thickness and consists of a polymeric binding agent in which is embedded magnetizable particles, such as iron filings. The iron filings are, however, confined to the inner and outer annular portions 11b, 11a and the annular portion (unnumbered) therebetween is unmagnetized and appreciably more resilient. The disk of the seal 11 may also be covered with a disk or layer 8 of plastic material in contact with the bearing races or similar relatively rotatable components 5, 6.

In FIGURE 4 of the drawings a pair of sliding-ring seals 11 of FIGURE 3 are shown housed in axially oppositely opening circular grooves 5a, 6a and 5b, 6b. In this manner a seal is provided for completely excluding air or grit from between the bearing races 5, 6, and grease (not shown) therein will not harden or otherwise lose its lubricating characteristics.

A slide-ring seal unit 12 of FIGURE 5 is formed in part by the seal 11 of FIGURE 3 which is magnetically secured to steel annular disks 15, 16. The disks 15, 16 are in turn held captive in grooves (unnumbered) of housing rings 13, 14 having respective radially opposed extensions or flanges 13a, 14a between which is an annular gap 17. The gap 17 is extremely small and prevents particles from penetrating into a space 18. The unit 12 is therefore maintained assembled by the seal 11, thereby performing a secondary function in addition to its primary function of providing an efficient seal when in use.

Figure 6:
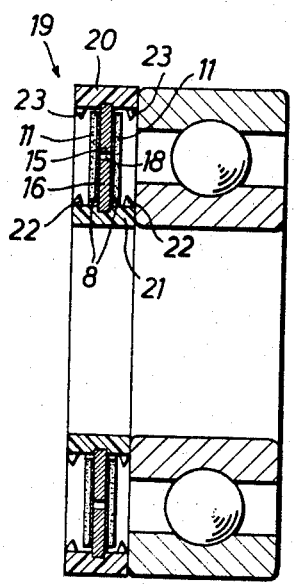
FIG. 6 illustrates a pair of the seals of FIG. 3 associated with a pair of inner and outer annular retaining disks, and the association thereof with inner and outer races of a bearing assembly.
Figure 7:
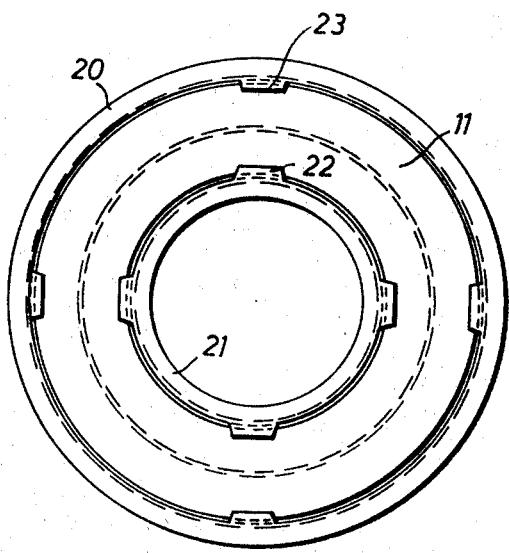
FIG. 7 is an axial end elevational view of the assembly of FIG. 6, and illustrates a plurality of radial projections of the retaining disks for maintaining the components in assembled relationship.

Another slide-ring seal unit 19 is shown in FIGURES 6 and 7, and includes a pair of annular metallic (steel) disks 15, 16 connected to nonmagnetic (plastic) housing rings 20, 21. A slide-ring seal 11 of the type shown in FIGURE 3 is magnetically secured to each face of the rings 15, 16 closing the annular gap 18 therebetween and preventing air from hardening grease (not shown) in the gap 18. To positively assure against the removal of the rings 15, 16 axially outwardly of the rings 20, 21, the latter are provided with respective inwardly and outwardly directed circumferentially spaced noses or flanges 23, 22.

What is claimed is:

1. A slide ring seal assembly for sealing relatively moving components comprising, in combination:
   (a) a pair of coaxially, radially disposed annular disks comprising magnetic material,
   (b) means securing each said annular disk to a corresponding moving component, and
   (c) a flexible, magnetic slide ring seal means having spaced first and second sealing portions,
   (d) said first sealing portion being contiguous to one of the said annular disks and magnetically attached thereto and said second sealing portion being contiguous to the other of said annular disks and magnetically attached thereto.

2. An assembly as defined in claim 1 wherein said slide ring seal means includes at least one sealing member having a cross-sectional uniform thickness.

3. A slide ring assembly as defined in claim 2 wherein there is a sealing member magnetically secured to each side of said annular disks.

4. An assembly as defined in claim 2 wherein a gap with a distance between the coaxially, radially disposed annular disks is of an amount effective to provide a sufficient surface on each of said disks for an adequate sealing contact with said sealing member.

5. An assembly as defined in claim 4 wherein said gap is filled with grease and oil.

6. An assembly as defined in claim 2 wherein said securing means includes a pair of coaxially disposed holding rings, each said holding ring having a grooved portion accommodating one of the said annular disks.

7. An assembly as defined in claim 6 wherein said holding rings have radially opposed noses adjacent said grooved portion and contiguous to said annular disks to prevent the axial removal of said annular disks from between said holding rings.

8. An assembly as defined in claim 6 wherein there is a sealing member magnetically secured to each side of said annular disk.

9. An assembly as defined in claim 8 wherein each holding ring includes flange means to maintain the position of the sealing members within the said assembly.

References Cited

UNITED STATES PATENTS 3,128,104  4/1964  Teske _____ 277—80 X

FOREIGN PATENTS 874,517    8/1961  Great Britain.
1,187,873  2/1965  Germany.

SAMUEL ROTHBERG, *Primary Examiner.*

U.S. Cl. X.R.

277—83